United States Patent [19] [11] 3,890,685
Rünte et al. [45] June 24, 1975

[54] METHOD FOR MANUFACTURING HOLLOW SCREWS FOR HEAT EXCHANGERS

[75] Inventors: Helmut Rünte; Peter Schwartz, both of Krefeld, Germany

[73] Assignee: Bayer Aktiengesellschaft, Leverkusen, Germany

[22] Filed: May 30, 1974

[21] Appl. No.: 474,622

[30] Foreign Application Priority Data
June 6, 1973 Germany............................ 2328793

[52] U.S. Cl........ 29/156.8 H; 10/10 R; 29/157.3 R; 165/87
[51] Int. Cl............................................. B23p 15/02
[58] Field of Search...... 10/10 R, 27 R; 29/156.8 H, 29/157.3 R, 483, 530; 85/46 R; 165/87

[56] References Cited
UNITED STATES PATENTS
2,724,979   11/1955   Cross.......................... 29/157.3 R X
2,883,163   4/1959   Solheim............................. 165/87
3,201,856   8/1965   Keegan et al.................. 29/156.8 H
3,209,640   10/1965   Waivers................................. 85/1 R
3,378,912   4/1968   Wallace........................... 10/10 R X

OTHER PUBLICATIONS

Catalog 102, "Holo–Flite Processor," Western Precipitation Group of Joy Manufacturing Company, Los Angeles.

Primary Examiner—C. W. Lanham
Assistant Examiner—D. C. Reiley, III
Attorney, Agent, or Firm—Burgess, Dinklage & Sprung

[57] ABSTRACT

Hollow screws for heat exchangers are produced by cutting a groove along the screw comb and by welding the edges of the groove walls to form a continuous void designed to communicate with inlets and outlets at the end of the screw.

4 Claims, 2 Drawing Figures

METHOD FOR MANUFACTURING HOLLOW SCREWS FOR HEAT EXCHANGERS

This invention relates to a method for maunfacturing hollow screws for heat exchangers.

Hollow screws are used as heat exchangers, for example in the production of highly viscous products, in order to create an extra heating facility in addition to direct heating of the screw cylinder.

Hollow screws of this kind are knows both in the form of self-cleaning screws and in the form of non-self-cleaning screws. Self-cleaning screws are relatively expensive to produce from solid material on account of the many difficult machining operations involved. Hollow screws formed from sheet metal and subsequently welded are used for processes where there is no real need for a self-cleaning effect. In this case, a hollow profile of sheet metal is generally welded into a tube. With high-viscosity products sagging is inevitable in the case of multiple screws. At those points where the hollow profiles are welded onto the tube, sagging gives rise to strees peaks in the weld seams. Due to the alternating stresses to which they are subjected, the seams split open and hence give rise to leaks.

Accordingly, the object of the invention is to provide a method for manufacturing hollow screws for heat exchangers in which the hollow screws produced are, on the one hand, self-cleaning and, on the other hand, able to withstand relatively heavy stressing. At the same time, the costs involved in manufacturing a hollow screw of this kind are (should be kept) within reasonable limits.

According to the invention, there is provided a method for manufacturing hollow screws for heat exchangers, the screw threads being cut from the solid material, wherein a groove is cut into the screw thread along the screw comb, and the edges of the groove walls are joined together by an impervious weld seam.

Cutting the groove and closing the groove by welding are both relatively simple operations which can be carried out automatically. There is no need at all for preformed profiles of the kind which are required for sheet-metal screws and whose tolerances are naturally fairly wide. Screws produced in accordance with the invenion show greater rigidity than sheet-metal screws. In the case of relatively wide screws, however, it is of advantage to cover the groove with a profile before welding. Simple strips of iron or a T-profile, which at its foot fits into the groove, are sufficient for this purpose.

If it is desired to produce self-cleaning screws, the weld seam is machine-finished, for example by turning on a lathe or grinding, in another embodiment of the method according to the invention.

Another particular advantage of the method according to the invention is that a particularly durable material can be used for forming the weld seam, so that, at the same time, the screw comb is more effectively protected against wear.

So far as the path followed by the heat-exchanger grooves within the screw is concerned, inlets and outlets or individual cells formed by subdivision can be copied from known embodiments of sheet-metal hollow screws. In its simplest form, the screw shaft is formed at both ends with axial bores into which radical bores lead from the ends of the groove. In cases where the hollow screws are manufactured from hollow shafts, the hollow bore has to be interrupted by radical partitions at the necessary places. For example, the screw can be divided up into two or more separate heat-exchanger sections by arranging several eccentric bores in the axial direction, interrupting the groove accordingly and providing return channels, for example in the form of radial bores. The heat-exchange medium is introduced into and carried out of the screw in the usual way through packing.

Two embodiments of a hollow screw manufacture by the metod according to the invention are shown is cross-section in the accompanying drawings, wherein.

Figure 1:
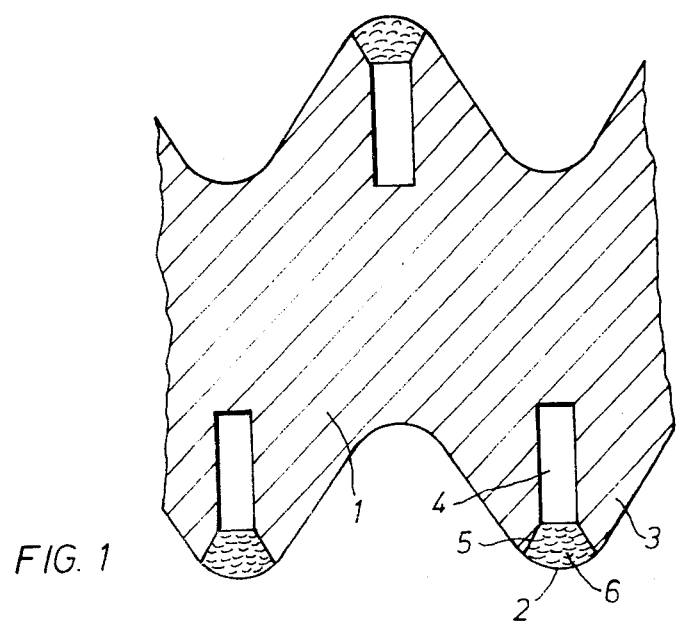
FIG. 1 shows a hollow screw in which the groove is closed by a weld seam.

In FIG. 1, a hollow screw 1 consists of solid material, a groove 4 being cut into the screw comb 2 of the screw thread 3. The screw comb 2 is chamfered at 5 towards the groove 4, so that a weld seam 6 can be conveniently applied.

Figure 2:
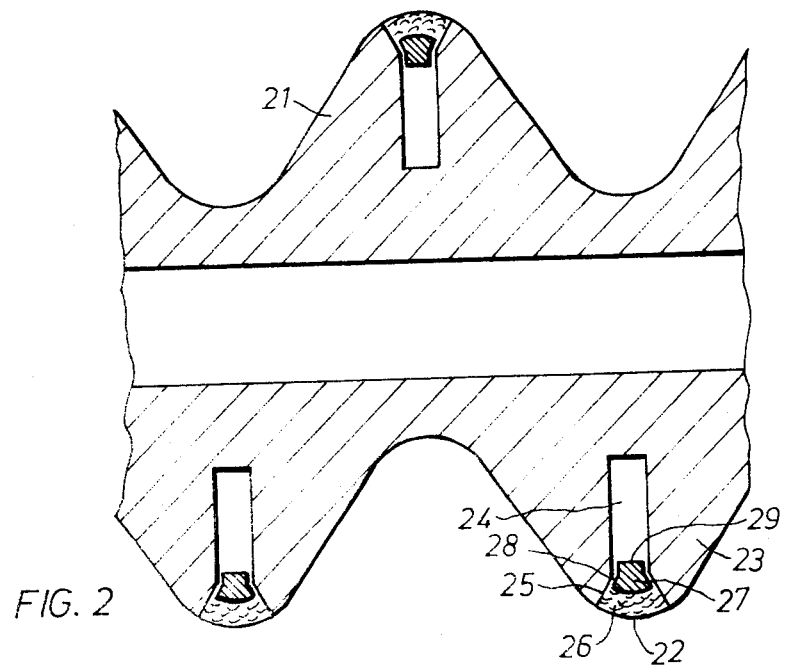
FIG. 2 shows a hollow screw in which the groove is covered by a profile and closed by a weld seam arranged over this profile.

In FIG. 2, a hollow screw 21 is produced from an annular cylinder. A groove 24 is milled into the screw comb 22 of the screw thread 23, being chamfered at 25 towards the screw comb 22. A profile 27 is placed onto the groove 24. This profile 27 rests on the chamfers 25 along its flanks 28 and, at its foot 29, projects into the groove 24 for centering purposes. The profile 27 is covered over externally by a weld seam 26.

What we claim is:

1. A method for manufacturing hollow screws for heat exchangers, comprising cutting a groove into the screw thread along the screw comb, and joining the edges of the groove walls together by an impervious weld seam.

2. A method as claimed in claim 1, wherein the groove is covered by a profile before welding.

3. A method as claimed in claim 1, wherein the weld seam is machine-finished.

4. A method as claimed in claim 2, wherein the weld seam is machine-finished.

* * * * *